United States Patent
Ulinger et al.

(10) Patent No.: US 10,363,857 B1
(45) Date of Patent: Jul. 30, 2019

(54) TRAILER TRASH KIT

(71) Applicants: Michael Ulinger, Glendale, AZ (US); Linda Katherine Ulinger, Glendale, AZ (US)

(72) Inventors: Michael Ulinger, Glendale, AZ (US); Linda Katherine Ulinger, Glendale, AZ (US)

( * ) Notice: Subject to any disclaimer, the term of this patent is extended or adjusted under 35 U.S.C. 154(b) by 0 days.

(21) Appl. No.: 14/998,964

(22) Filed: Mar. 11, 2016

Related U.S. Application Data

(60) Provisional application No. 62/177,996, filed on Mar. 30, 2015.

(51) Int. Cl.
*B60P 1/64* (2006.01)
*B60P 3/06* (2006.01)
*B60P 3/10* (2006.01)

(52) U.S. Cl.
CPC .............. *B60P 1/6427* (2013.01); *B60P 3/066* (2013.01); *B60P 3/105* (2013.01); *B60P 3/1066* (2013.01)

(58) Field of Classification Search
CPC .......... B60P 1/64; B60P 1/6427; B60P 3/066; B60P 3/1066
See application file for complete search history.

(56) References Cited

U.S. PATENT DOCUMENTS

| | | | | |
|---|---|---|---|---|
| 3,768,678 A | * | 10/1973 | Youngers | B60P 1/6427 254/45 |
| 3,811,697 A | * | 5/1974 | Armstrong | B60G 17/023 280/43.18 |
| 3,826,391 A | * | 7/1974 | Prince | B60P 3/1058 414/477 |
| 3,985,254 A | * | 10/1976 | Grandury | B60P 1/64 414/498 |
| 4,053,072 A | * | 10/1977 | Ross | B60P 1/6427 280/767 |
| 4,474,526 A | * | 10/1984 | Gevers | B60P 1/64 254/10 R |
| 4,645,406 A | * | 2/1987 | Cooper | B60P 1/6427 414/500 |
| 4,856,838 A | * | 8/1989 | Reshke | B60P 3/00 296/14 |
| 5,417,540 A | * | 5/1995 | Cox | B60P 1/6427 414/495 |
| 5,509,775 A | * | 4/1996 | Kendall | B60P 1/6454 414/437 |

(Continued)

*Primary Examiner* — Saul Rodriguez
*Assistant Examiner* — Ashley K Romano
(74) *Attorney, Agent, or Firm* — IPTechLaw

(57) ABSTRACT

The present implementation relates to an adjustable, removable, moving chain link fence or wall. The moving chain link fence or wall is part of a kit which may be installed to an existing truck or trailer having a flat bed, side walls and potentially a tail gate. The implementation may include a winch, a wheel assembly, and an adjustable, moving chain link fence or wall which can fit all trucks and trailers. In use, the implementation may be placed in the front of a truck or trailer and the bed is loaded with debris, or material. The winch may be activated in the "out" position. The device then travels along the top of the floor and pushes the debris or material out of the truck or trailer back end. Rubber wheels may be installed on the bottom of the implementation to ensure a smooth movement while in use.

15 Claims, 12 Drawing Sheets

(56) References Cited

U.S. PATENT DOCUMENTS

| | | | | |
|---|---|---|---|---|
| 5,755,549 A | * | 5/1998 | Ogrodnick | B60P 3/062 414/500 |
| 6,071,062 A | * | 6/2000 | Warhurst | B60P 1/6445 414/347 |
| 7,074,004 B2 | * | 7/2006 | Lockamy | B60P 1/6427 414/549 |
| 7,153,080 B2 | * | 12/2006 | Schmidt | B60P 1/025 414/482 |
| 8,434,991 B1 | * | 5/2013 | Hacker | B60P 1/6427 414/542 |
| 8,602,712 B2 | * | 12/2013 | Ritson | B60P 1/649 254/279 |
| 8,926,252 B2 | * | 1/2015 | McIver | B60P 1/6427 414/332 |

\* cited by examiner

TRAILER TRASH KIT

CROSS REFERENCE TO RELATED APPLICATIONS

This document claims the benefit of the filing date of U.S. Provisional Patent Application 62/177,996, entitled "Trailer trash kit" to Michael Ulinger et al. which was filed on Mar. 30, 2015, the disclosure of which is hereby incorporated entirely herein by reference.

BACKGROUND

1. Technical Field

The application is directed to utility trucks and trailers, and more particularly trucks and trailers which do not have the capability of dumping its load. Many trucks and trailers take daily loads of debris throughout the United States to the landfill. Materials commonly moved include, but are not limited to, landscape debris, roofing debris, construction debris etc. Without the luxury of a dump truck or dump bed, by hand these loads are difficult to unload, time consuming to unload, and present a risk of being injured to whoever is unloading the load. Safety and time are important to a truck operator as a truck operator is generally paid based on how much material they move from one location to another.

2. Background

Many transport trailers used by operators are of the self-unloading type. Self-unloading trailers use several forms of moving floors to unload material from trucks or trailers. Reciprocating slat floors, conveyor belt floors and dump beds are some commonly used. These floors substantially decrease the time required to eject material from trailers and trucks compared to manual ejection methods. These types of trailers are generally found in the application of a larger vehicle such as semi-truck or trailer. They are of a much larger scale, very expensive, and are not especially designed for smaller utility style trucks and trailers, such as trucks or trailers that carry landscaping debris (cactus, tree branches), construction debris (old and new), packaged goods (washers, dryers), and many other heavy loads. This adjustable kit is made to be compatible with a variety of trailers and trucks. In various implementations, it can be installed on any trailer or truck 4'-8' wide and any length. It makes unloading those heavy loads easy, with only one person required and a push of a button. The kit can also be removed with only one person.

SUMMARY

Implementations may include a kit which can be installed in the bed of any truck or trailer 4'-8' wide and any length. It is actually a moving fence or wall that is powered by a powerful 12 volt electric winch. The moving wall/fence makes contact with the load. The load in the bed of the truck or trailer is pushed and unloaded out the back. It makes unloading a truck or trailer a lot safer, easier, faster and cost effective.

This implementation makes unloading safer. A lot of debris hauled may be broken and may have sharp edges. This kit eliminates the need to get in the back of or on top of a truck or trailer loaded with various debris to unload the truck or trailer with a pitch fork, rake, or shovel.

The unloading device makes unloading a heavy truck or trailer bed a lot easier than doing all of the unloading by hand.

This unloading device is much faster than unloading by hand.

This unloading device is cost effective. Only one person is needed to unload a truck or trailer and can do so in a much quicker time. It is much less expensive than purchasing a dump style bed as this unloading device can be added to an already owned flat bed truck or trailer, at a fraction of the cost.

Various implementation may have the following features: A removable frame and fence that is placed in the bed of a truck or trailer; the device may be powered by a 12 volt electric winch or by other variable size motors as needed; variable length power cables that will fit any legal length truck or trailer; an expandable frame which may adjust to fit a vehicle flat bed; horizontal side rails that may have wheels on the sides and on the bottom to help guide the moving wall; the ability to retract the fence and frame using the winch after the trailer or truck is unloaded; the ability to load other heavy objects such as, by non-limiting example, cars, vehicles, atv's, boats, etc.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
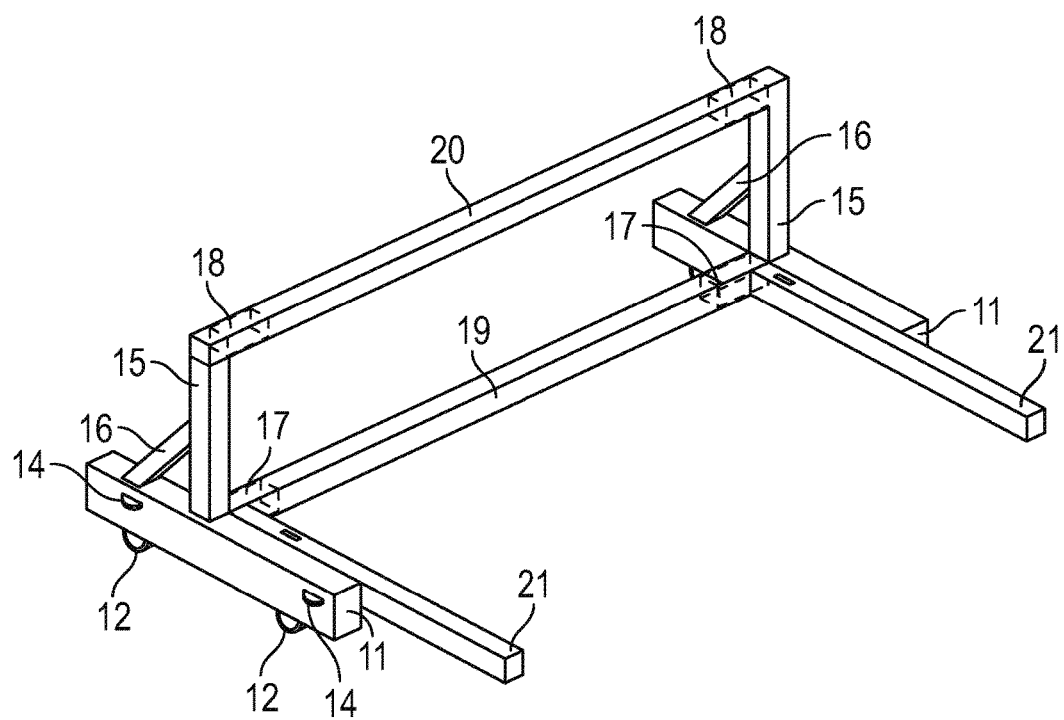
FIG. 1 is a perspective view of one implementation of a first frame.

This disclosure, its aspects and implementations, are not limited to the specific components, assembly procedures or method elements disclosed herein. Many additional components, assembly procedures and/or method elements known in the art consistent with the intended debris removal device will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such debris removal devices, and implementing components and methods, consistent with the intended operation and methods.

The "Trailer Trash Kit" was developed to unload or load objects from a truck or trailer. A fence may be pulled from the front of a flat bed trailer or truck to the back of the bed, using a power of a winch. It may be able to unload all of it contents and then return to the front with a push of a button, ready for another load.

In various implementations, the kit may include a moving steel fence made out of welded, heavy gauge steel (or aluminum.) tubing and steel chain link fence for long lasting strength and durability.

The "Trailer Trash Kit" may be made of steel or aluminum and will fit most any truck or trailer.

The kit may be designed so one person can unload objects or debris from a truck or trailer and can do so easily, quickly, and safely with the push of a button. Rather than using a crew, only one person is necessary.

The powerful 12 volt winch and the moving fence (wall), can compress loaded debris from the front of the bed to the back of the bed to make room for more waste. It can do so with a push of a button which is easy, fast, and safe in comparison to packing it down from the top manually, which takes a lot of time, labor and raises safety concerns.

Once ready to unload the contents of the bed of the truck or trailer, simply drop the tail gate or open the rear gates, push a button and the contents are unloaded in a few minutes.

In various implementations the kit (or unloading device) is adjustable to fit any of a truck or trailer measuring 4'-8' wide and beds up to 36' long. This kit can also be made in a much larger scale for much larger beds such as tractor and trailer semi-trucks.

Furthermore, the fence can be removed easily, by detaching the winch cables. With the fence removed, the winch may be used for a variety of other heavy pulling.

1. Introduction and Environment

Detailed aspects of the present implementation are disclosed herein, however, it is to be understood that the disclosed aspects are merely exemplary of the implementation, which may be embodied in various forms. Therefore specific structural and functional details disclosed herein, are not to be interpreted as limiting, but, merely as a basis for the claims and as a representative basis for teaching one skilled in the art of how to variously employ the present implementation in virtually any appropriately detailed structure.

Certain terminology will be used in the following description for convenience in reference only, and will not be limiting. For example, upper, lower, front, back, right and left refer to the implementation as orientated in the view being referred to. The words "inward" and "outward" refer to the directions toward and away from, respectively the geometric center of the aspect being described and designated parts thereof. The terminology will include the words specifically mentioned, derivatives thereof and words of similar meaning.

The present implementation features an unloading system, which mounts within an existing utility trailer, or a utility truck, and may be used to unload material and or debris from within that vehicle bed. The implementation can also be removed easily by one person. The present implementation may be included in a new trailer or truck or easily installed to an existing trailer or truck.

2. Implementations

The implementations discussed herein, are merely illustrative of specific manners in which to make and use the implementation and not to be interpreted as limiting the scope of the instant implementation.

FIG. 1 illustrates a perspective view of one implementation of a first frame. Two rectangular base members 11 are each mounted horizontally onto a pair of rollers, 12. This gives the system a smooth and easy in and out motion as it rolls up and down the trailer/truck floor. The two rectangular base members 11 may also have a pair of vertically mounted rollers 14 attached to the outside of each base member 11. This keeps the system tight inside the trailer/truck walls. A vertical square post 15 may be attached to each base member 11. The vertical square post 15 may be supported by a 45 degree square post 16, which may be coupled to post 15 and post 11.

A short length of square tubing 17 may be attached horizontally and to each rectangular base member 11 facing inward.

A short length of square tubing 18 may be attached horizontally and near the top of each vertical square post 15 facing inward, and may be of the same length as square tubing 17. A lower cross member 19 may slip over the square tubing 17 that is mounted to each lower rectangular base member 11. An upper cross member 20 is also square and is made to slip over or inside each of the horizontally mounted tubing 18. In various implementations the unloading device includes swing arms 21.

Figure 2:
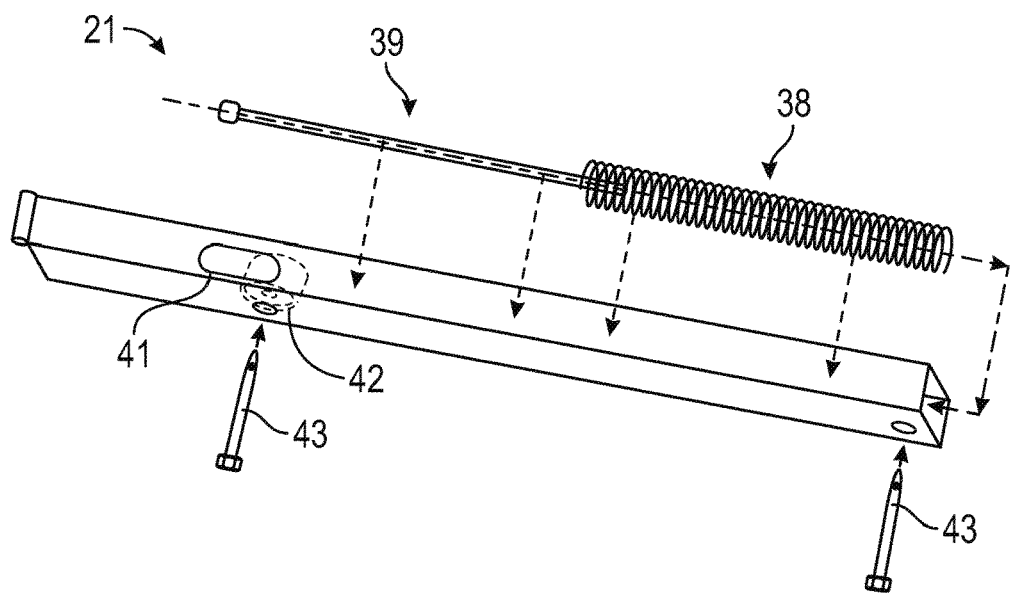
FIG. 2 is a perspective view of the swing arm assembly and its contents.

Referring now to FIG. 2, a perspective view of the swing arm assembly and its contents is illustrated. In various implementations, the swing arm assembly may be spring loaded and include square tubing, a spring 38, and a cable 39, which may be attached to one end of the spring 38. Both the cable 39 and spring 38 are inserted into the square tubing. The cable may exit the square tubing. In such implementations, the cable may exit over a cable wheel 42, which may eliminate friction of the cable against the exit hole. The wheel, 42, may be held in place by a pin, 43. The opposite end of the spring 38 may be held in place by another pin 43.

Figure 3:
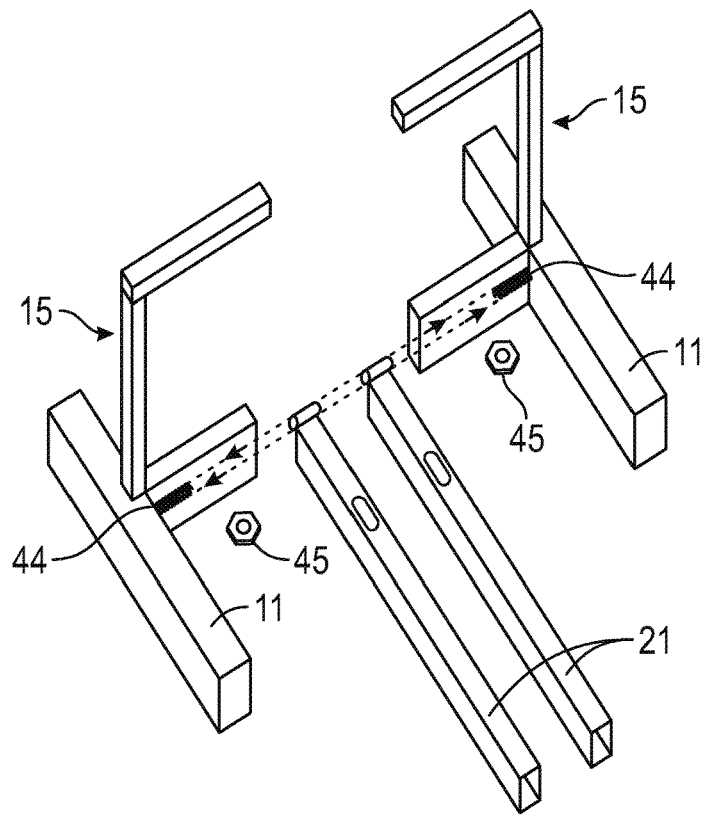
FIG. 3 is a perspective view of the swing arm assembly and how they attach to the first frame.

Referring now to FIG. 3, a perspective view of the swing arm assembly and how they attach to the first frame 1000 is illustrated. The spring loaded swing arms, 21, may be attached to a preinstalled stud 44. The stud may be coupled to the two rectangular base members 11. A lock nut 45 may be used to complete the attachments. The locknut 45 must not be tight as this is a pivot point and must swing freely.

Figure 4:
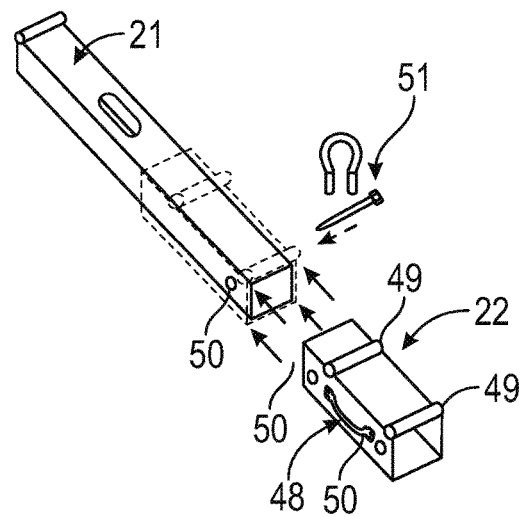
FIG. 4 is an exploded view of extension arms and the swing arm assembly.

Referring to FIG. 4, an exploded view of extension arms and the swing arm assembly is illustrated. Extension arms 22 may include square tubing, an off-set tubing as part of a hinge, a handle 48, and a solid round steel bar 49. Two holes 50 may be drilled for an adjusting pin 23.

Figure 5:
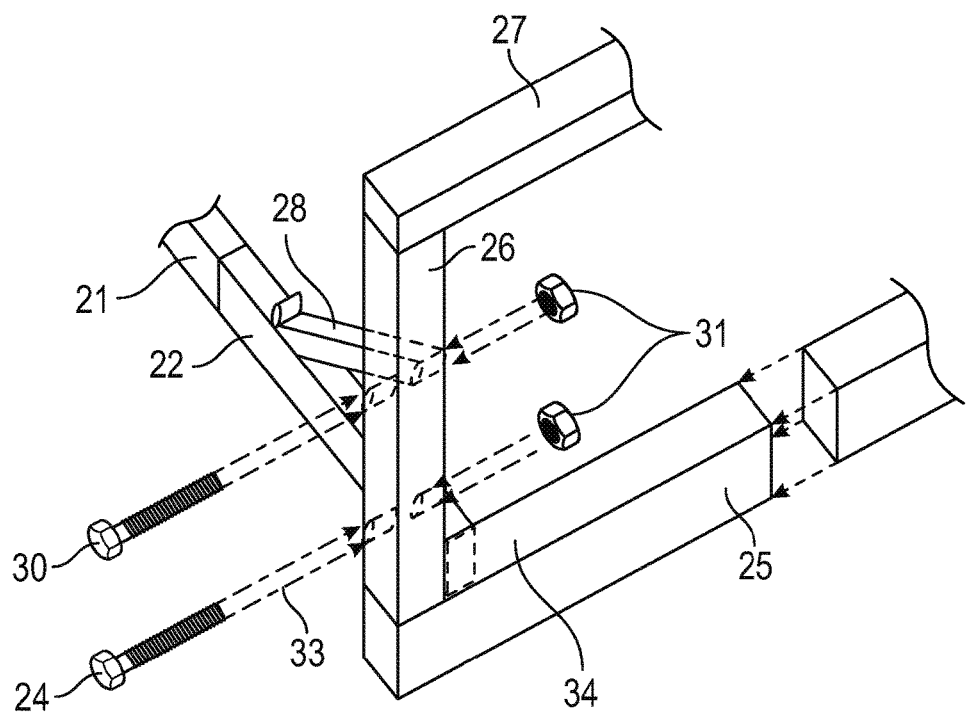
FIG. 5 is a perspective view of the extension arms coupled to a second frame.

Referring to FIG. 5, a perspective view of the extension arms coupled to a second frame is illustrated. The extension arms, 22, may be attached to each swing arm, 21, using a locking pin. The two extension arms, 22, may or may not be needed, it will depend on the length of the drop down tailgate. Some drop down style tail gates, measure up to 4' in length, this option is only used if needed. The extension arm 22 may be coupled to a second frame through a bolt 24 and locknut 31. At the base of the second frame is a short horizontal square tubing 25. Vertically attached to each outer end of the horizontal square tubing 25 is a vertical square tubing 26 extending up. At the top of each vertical square tubing 26 there may be another horizontal square tubing 27 extending inward. The second frame may include a brace 28. The brace may be located at the end of each second frame brace, 28, attached. is a off-set tubing, 34, to match the bolt diameter, 30, and lock nut 31. Located on the vertical square, tubing, 26, is attached a off-set tubing, 33, to also match the same size of the bolt, 30, and lock nut, 31. The bolt, 30, and lock nut 31 may be installed loose allowing the second frame brace, 28, to pivot freely at this point. The brace 28 may also lock in place.

Figure 6:
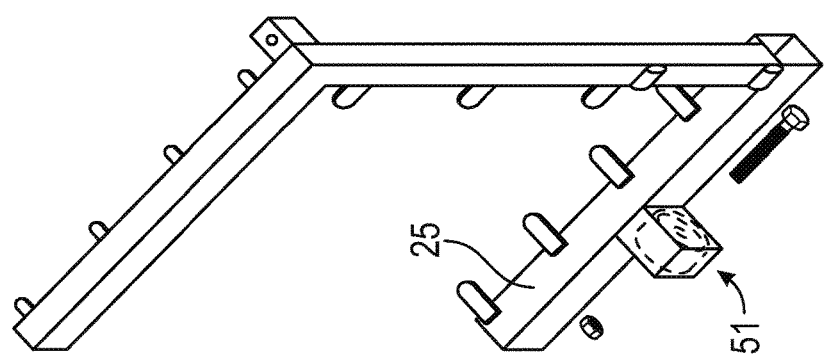
FIG. 6 is view of a portion of the second frame with a wheel coupled thereto.

Referring to FIG. 6, a view of a portion of the second frame with a wheel coupled thereto is illustrated. A wheel 51 may be attached to the short horizontal square tubing 25 to ensure smooth operation forward and backward on the truck or trailer bed.

Figure 7:
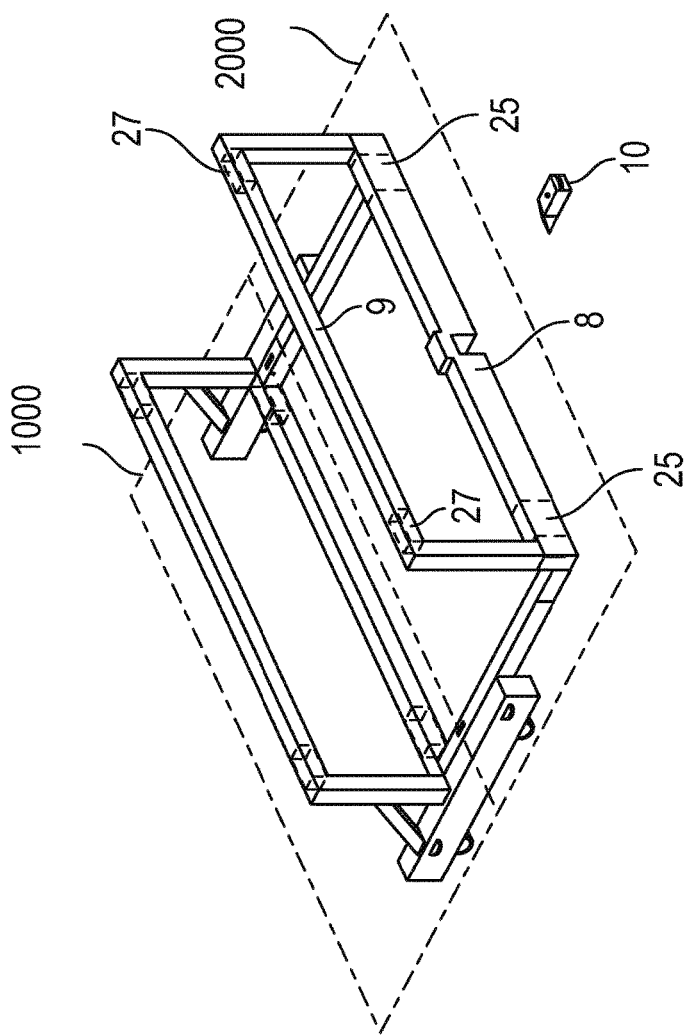
FIG. 7 is a perspective view of the first frame coupled to the second frame.

Referring to FIG. 7, a perspective view of the first frame 1000 coupled to the second frame is illustrated. The second frame 2000 may raise and lower should there be a need to unload past the wheel assembly 10 located at the rear of the trailer. A lower cross member 8 may be square and may be made to slip inside or over each end of the horizontal square tubing 25. The lower cross member 8 may be made in the center to clear the obstructed wheel assembly 10 located in the rear center of the bed. An upper cross member 9 may be square and made to slip inside or over each end of the horizontal square tubing 27.

Figure 8:
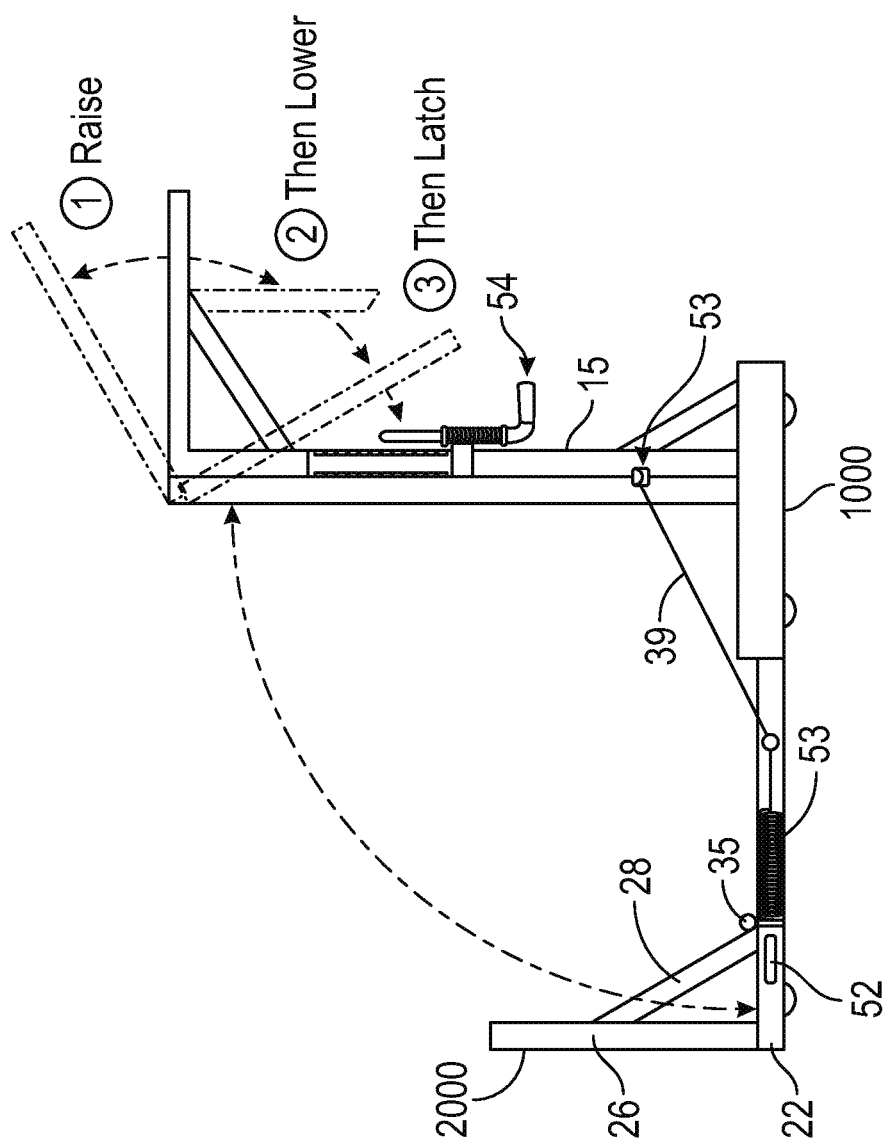
FIG. 8 is a side view of the first and second frame and illustrates the movement of the second frame in relation to the first frame.

Referring to FIG. 8, a side view of the first and second frame illustrating the movement of the second frame in relation to the first frame 1000 is illustrated. Brace 28 may include square tubing and may be attached at a 45 degree angle to support the vertical square tubing 26. This connection may be of a hinge type using a bolt and lock nut. In order for the brace 28 to lock into place, a solid circular tube 35 may be added to the extension arm. With the "B" frame, 2000, in the vertical position, the brace 28 may be lowered and locked into place for support of the second frame. A swing arm handle 52 may be attached to both extension arms 22 for ease of operation. The spring cable 39 may be attached to a spring cable attachment notch 53 located on the vertical post 15. With the attachment of the spring loaded swing arm, assembly 21, the second frame 2000 becomes much lighter to lower, and raise, which accommodates one operator for ease of operation. With the second frame 2000 in its raised position, gate latches 54 may be installed on the vertical posts 15 and vertical posts 26 to hold the second frame 2000 in place when not in use.

Figure 9:
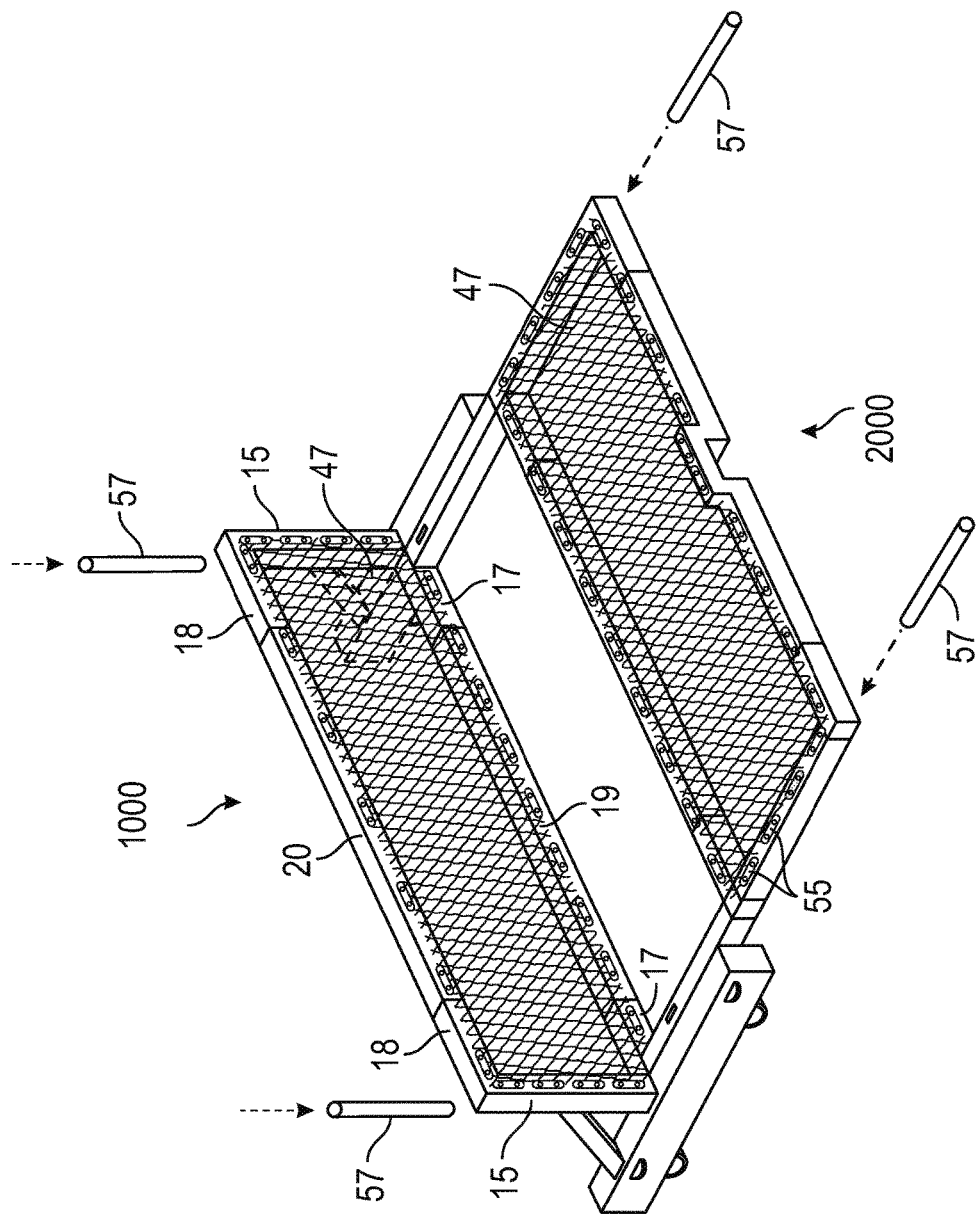
FIG. 9 is a perspective view of one implementation of the first and second frame with chain link fencing installed.

Referring to FIG. 9, a perspective view of one implementation of the first and second frame with chain link fencing installed is illustrated. Fence tabs 55 may be attached around the circumference of the first frame 1000 and second frame 2000. The fence tabs 55 may be installed to hold chain link fencing 47 in place on each frame. The first frame tabs may be located on, both vertical posts 15 and the horizontal posts, 17, 18, 19 and/or 20. The second frame tabs, 55, may be located on the second frame. In the implementation illustrated by FIG. 9, the second frame does not have any vertical posts. In this implementation, the fencing may be coupled to the frame so that it lays flat on the truck or trailer bed when it is in a lowered position and acts as a continuation of the wall or fencing of the first frame 1000 when it is in the vertical position. In other implementations, such as the one illustrated in FIG. 7, fencing may be added to the second frame 2000 by coupling frame tabs to vertical posts 29 and the horizontal posts, 25, 27, 8, and/or 19. In various implementations, the chain link fence 47 may be attached and secured with four tension bars 57. A tension bar may be installed to each end of the measured chain link fencing 47. The chain link fencing 47 may then be laid in place and secured with the multiple fence tabs 55.

Figure 10:
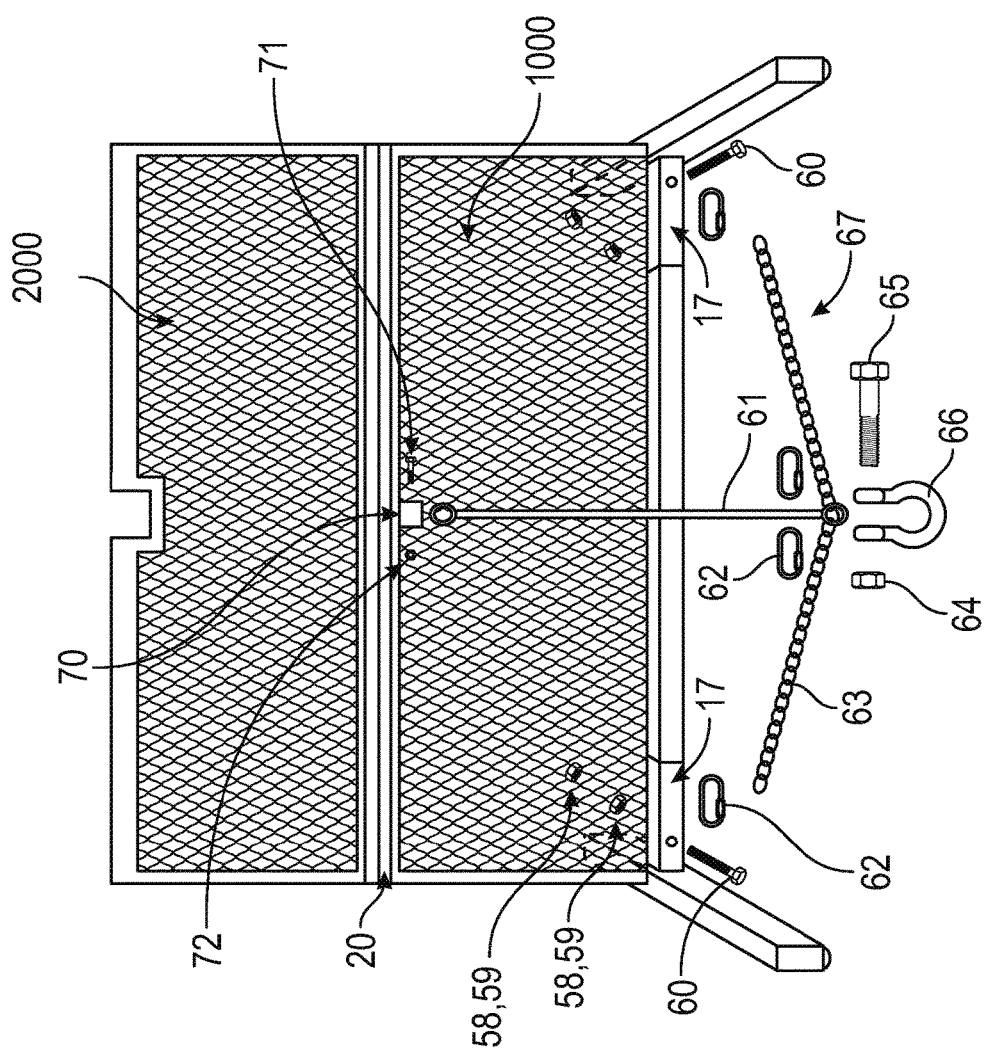
FIG. 10 is an exploded view of harness components and the first and second frame.

Referring to FIG. 10, an exploded view of harness components and the first and second frame is illustrated. In order to pull or advance the moving fence to the rear of the truck or trailer bed, a harness 67 is attached to the front side (faces towards the rear of truck or trailer) of the first frame 1000. The harness 67 may be comprised of a shackle 66, a shackle bolt 65, a shackle bolt nut 64, a chain 63, four quick link connectors 62, one fitted stabilizer cable 61, two eye bolts 60, two flat washers 59, and two lock nuts 58.

An eye bolt 60 may be installed through a predrilled hole in each horizontal square tubing 25. The eye bolt 60 may be held in place by a washer 59 and lock nut 58. A quick link 62 is used to attach a chain 63 to the eye bolt 60. On the opposite end of the chain 63, another quick link may be used to attach the chain 63 to the shackle 66. A fitted stabilizer cable 61 may be added to help keep the first frame 1000 stable if needed. The stabilizer cable 61 may be attached to the shackle bolt 65 when it is installed in the shackle 66. The opposite end of the stabilizer cable 61 may be attached to a bracket 70 on the upper cross member 20 using a bolt 71 and lock nut 72.

Figure 11:
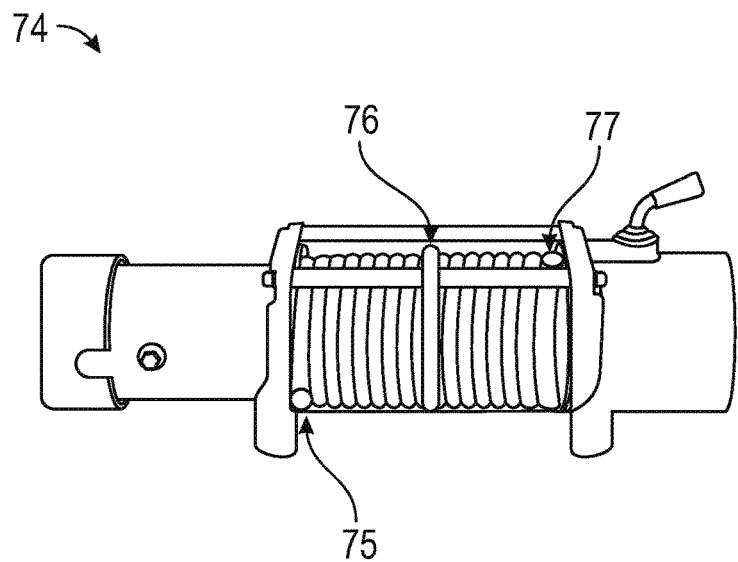
FIG. 11 is a front view of a winch with a new spool (drum) design.

Referring to FIG. 11, a front view of a winch with a new spool (drum) design is illustrated. In various implementations, the winch 74 may be a 12 volt electric winch and may be designed to pull wire rope or a cable 75 off the bottom of the split spool 76 and pull a wire rope or cable 77 off the top of the spool 76.

Figure 12:
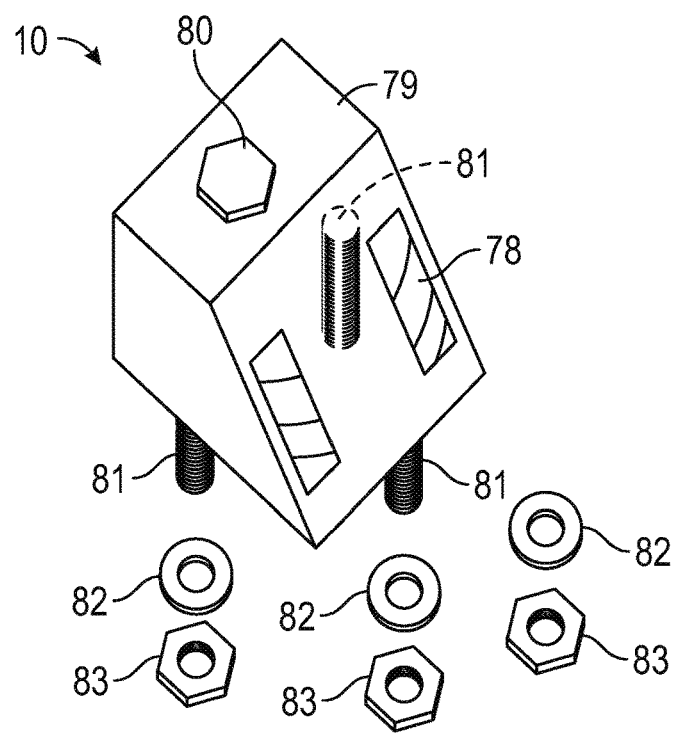
FIG. 12 is a perspective view of a wheel assembly.

Referring to FIG. 12, a perspective view of a wheel assembly is illustrated. Wheel assembly 10 may include one or more wire rope or cable wheels 78 installed inside of a heavy steel box 79, and the steel box may be fastened to the truck or trailer bed using an axle bolt 80, three studs 81, three washers 82, and three lock nuts 83. The wheel assembly may be in the center and rear of the trailer or truck bed.

Figure 13:
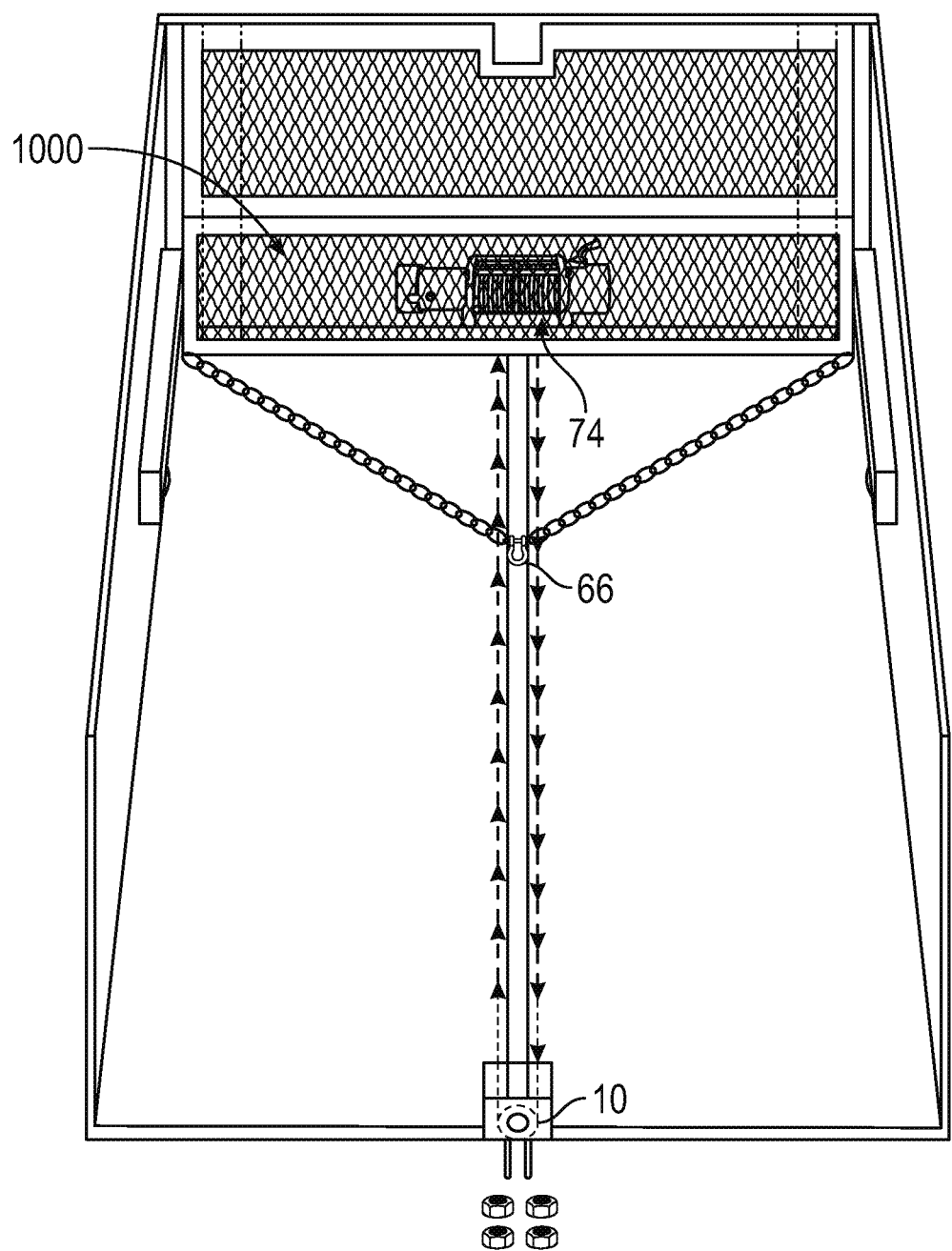
FIG. 13 is a perspective view of the connection between the winch and the harness.

Referring to FIG. 13, a perspective view of the connection between the winch and a harness is illustrated. The winch 74 may be mounted to the center and front of the truck or trailer bed. The wheel assembly 10 may be attached with three pre drilled holes at the center and rear of the bed. A longer cable may be unwound off the bottom of the spool 52 and may be routed under the first frame 1000 and down and around the wheel assembly 10 at the rear of the truck or trailer bed. The longer cable end may be attached to the shackle 66. With the first frame 1000 resting at the front of the truck or trailer bed, a second cable may be attached to the back of the first frame 1000.

Figure 14:
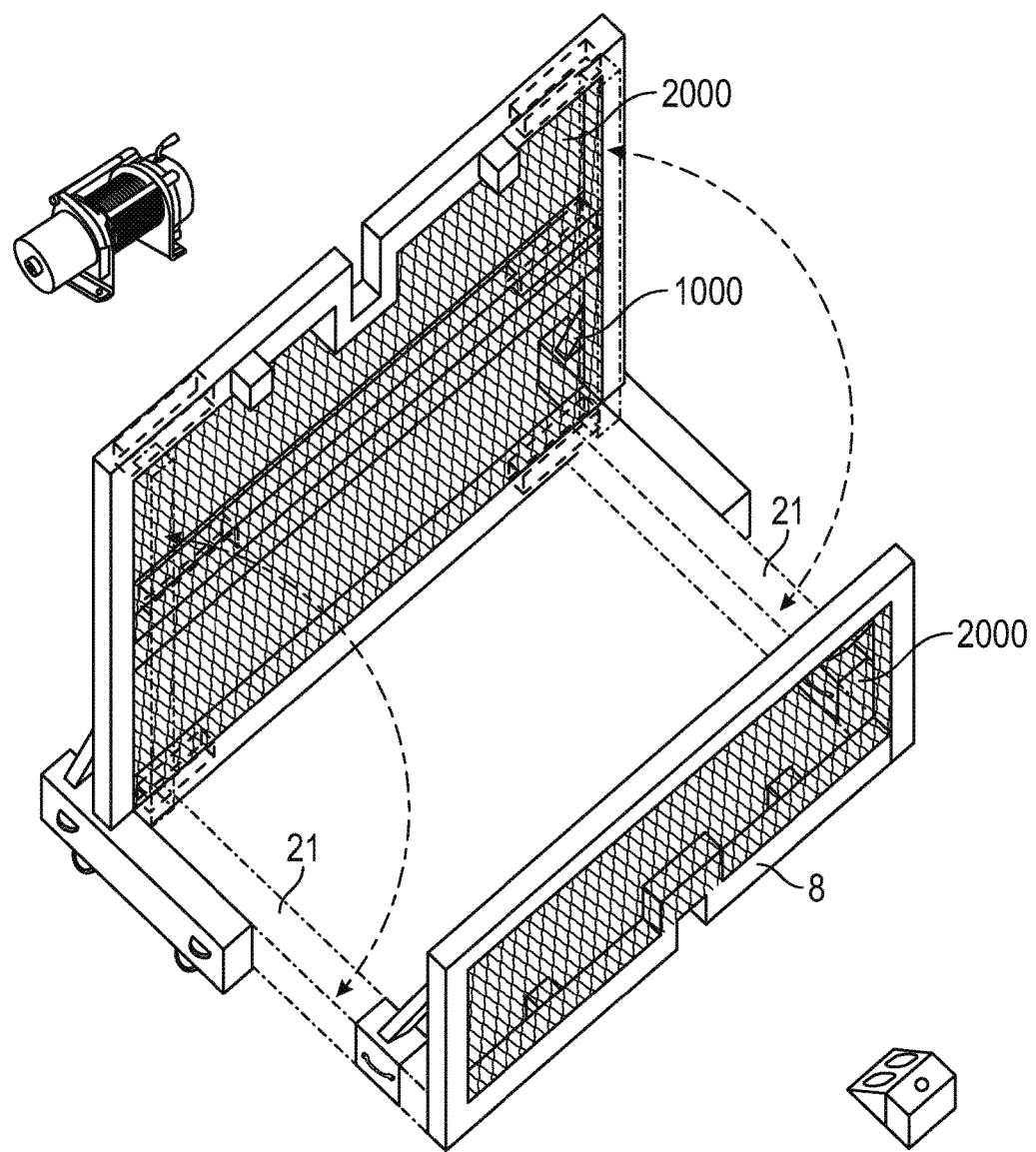
FIG. 14 is a perspective view of one implementation how the second frame raises and lowers.

Referring to FIG. 14, a view illustrating how the second 2000 moves in relation to the first frame 1000 is illustrated. The second frame 2000 may be coupled to spring arms 21. The spring arms 21 may assist in raising the second frame 2000 to a point where horizontal tubing 8 is substantially straight above horizontal tubing 20. The second frame may then rotate down to make a continuous wall between first frame 1000 and second frame 2000.

Figure 15:
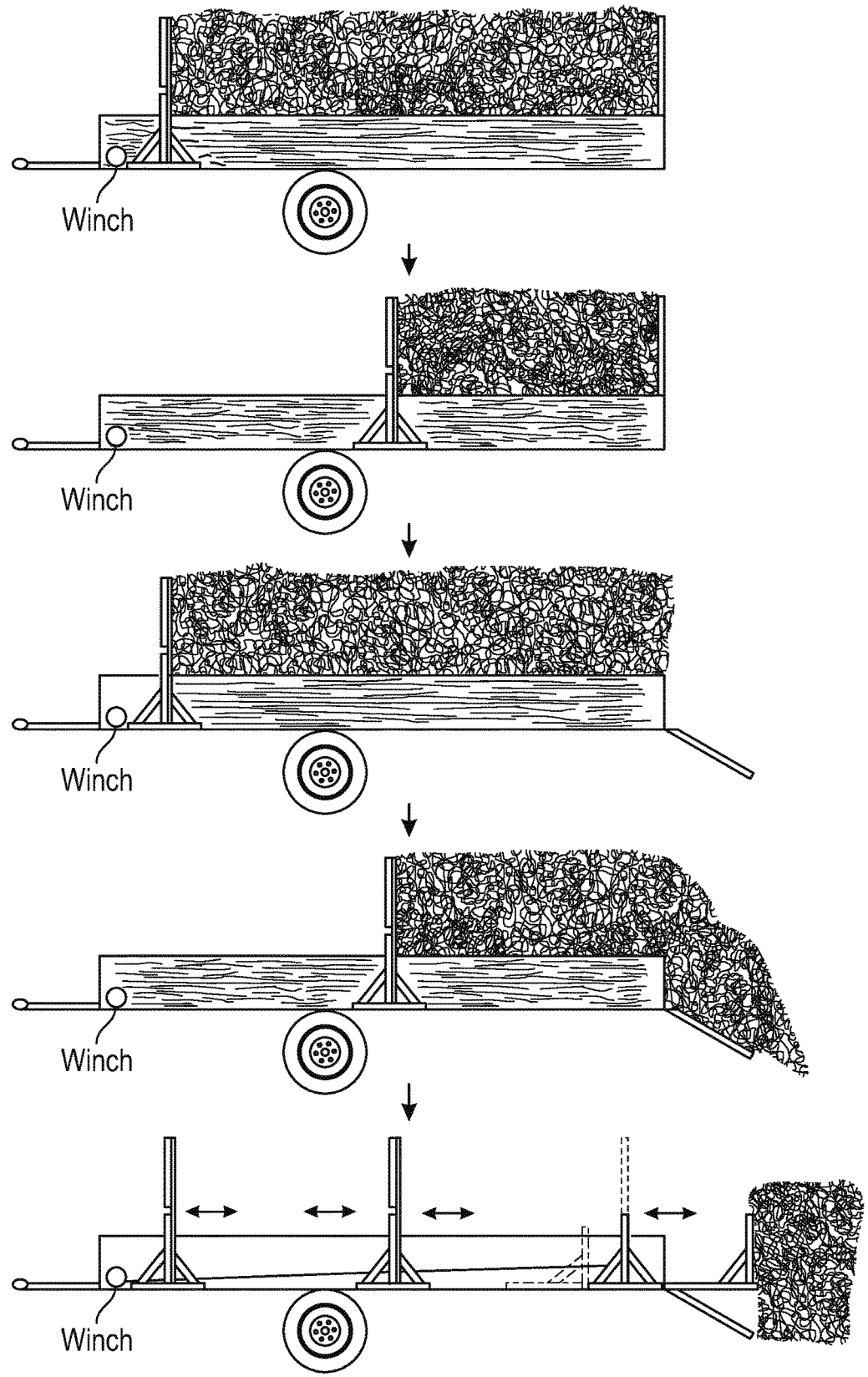
FIG. 15 is a side view of a flat bed trailer utilizing the installed unloading device.

Referring to FIG. 15, a view of a process flow for unloading a trailer is illustrated. The winch may be activated with the tailgate up to compress the debris. The winch may then be put in reverse to move the wall back to where it begin, allowing for more debris to be loaded. After this, the tailgate may be lowered and the winch may be activated allowing for the wall to push the debris from the trailer. When the wall has reached the wheel assembly at the end of the trailer the winch may be put back into reverse and withdraw from the debris. The second frame may then be folded down from the first frame and propped into a vertical position using at least one brace. The winch may then be activated again to finish pushing the debris left on the back of the trailer behind the wheel assembly completely off the trailer.

Figure 16:
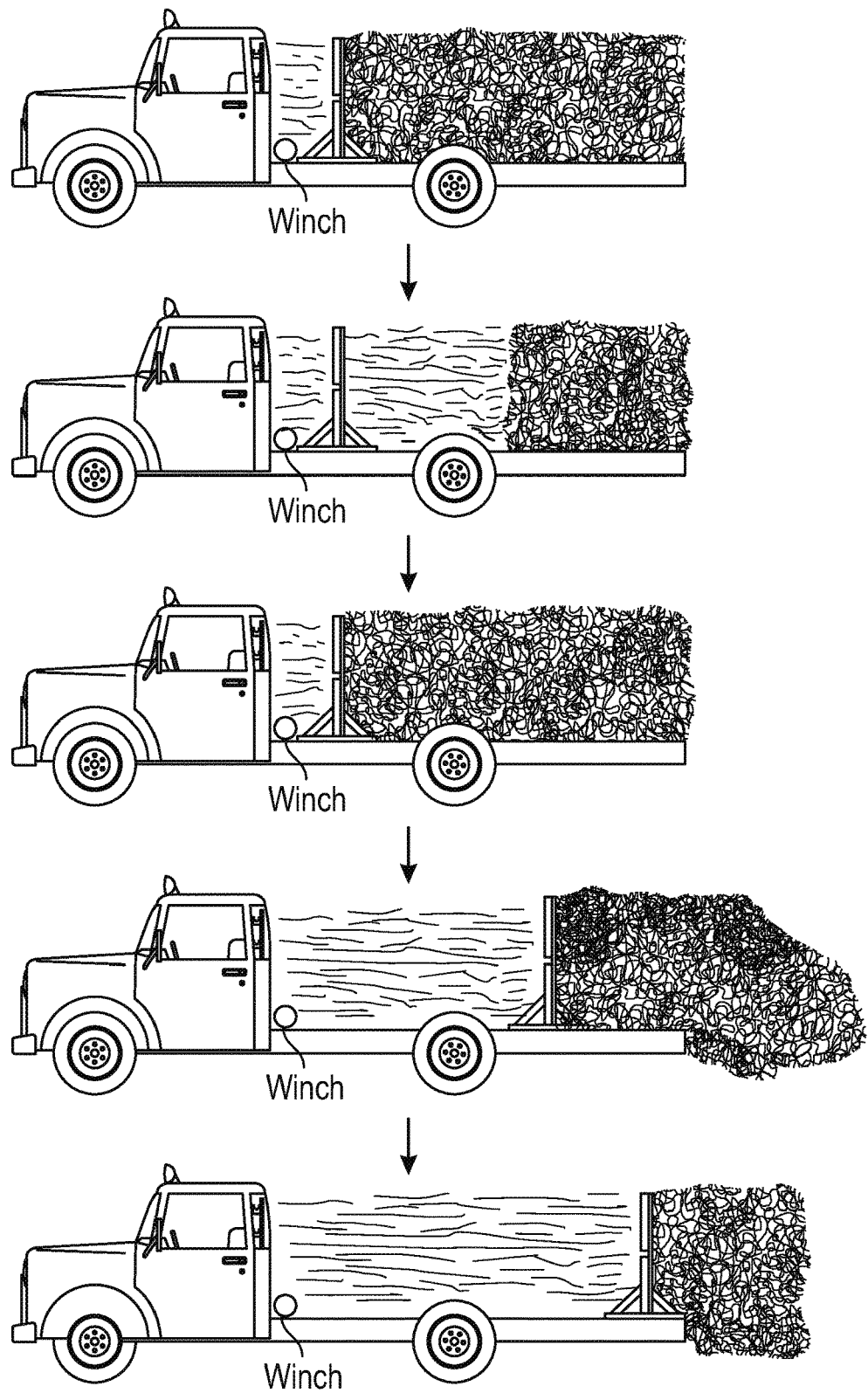
FIG. 16 is a side view of a flat bed truck utilizing the installed unloading device.

Referring to FIG. 16, a view of a process flow for unloading a truck is illustrated. This process is the same as the process illustrated in FIG. 15, with the exception that a truck is used rather than a trailer and a second frame is never dropped to finish pushing the debris off of the truck.

In various implementations, the base and support members and all frames are made of metal, however, in other implementations they may be formed of any other appropriate material capable of achieving the desired form and performing the desired function including, but not limited to, plastic or wood.

While the preferred implementations of the kit have been described, it should be understood that various changes, adaptations and modifications may be made therein without departing from the spirit of the implementation and the scope of the claims.

The kit may be used in combination with a truck or trailer having a pair of upright, lateral, and parallel sidewalls extending fore and aft along the bed of the truck or trailer. The truck or trailer may have a cargo loading entrance at the rear of the truck or trailer bed. The kit may include an unloading system, for a truck or trailer, including two horizontal fenced frames, one horizontal fence frame with rollers, one horizontal fenced frame capable of lowering, a winch designed to pull in two different directions, one direction fore, one direction aft, a harness, a safety release link, a ready to mount pulley wheel for tethering the winch to the horizontal fenced frame with wheels.

The horizontal fenced frames may be adjustable to be compatible with a truck or trailer bed width from four feet wide to eight feet wide.

The unloading system may, in the upright position, be designed to move heavy loads aft as far to the rear of the truck or trailer until it has substantially reached the rear position of the wheel assembly located on the center, rear floor.

The horizontal fence frames may be in two sections. The top section of the horizontal fence frame may unfold and lower to the fixed floor of the bed of the truck or trailer. The top section of the unfolded horizontal fence frame may be designed for the capability of clearing the pulley wheel mounted at the rear of the truck or trailer bed. Thus the debris or cargo being extracted from the truck or trailer may be extracted beyond the wheel assembly.

The top section of the horizontal fence frame may be attached to a spring loaded arm. The spring loaded arm may be designed in such a manner to ease the lifting load of the top section of the horizontal fence frame.

The spring loaded arm may be equipped with a handle. The handle may be mounted on the outside edge of the spring arm for ease of handling while raising or lowering, the top section of the horizontal fence frame.

The two horizontal fence frames may be provided with a gate latch at either end of the horizontal fence frames to secure the top and bottom of the horizontal fence frames together, when they are in the upright position.

The unloading system may be mounted on horizontal rollers. The rollers may be designed to ease the movement for the unloading system as it moves fore and aft on the floor of the truck or trailer bed.

The unloading system may be mounted with vertical rollers as well as the horizontal rollers, designed to fit the horizontal fenced frame at the bottom where it comes in contact with the vertical sidewalls of the truck or trailer's bed. Thus, the vertical rollers are designed to ease the moving operation of the tightly adjusted the horizontal fence frames.

Attached to the front side of the unloading system may be an adjustable harness. After the adjustable unloading system is fitted to the truck or trailer, the adjustable harness may simply fit to a proper size using two chains and two quick links.

The unloading system may be powered by a 12 volt electric winch with a split spool design. The split spool design may be made to pull wire rope off the bottom of the spool as well as off the top of the spool. Thus, the spool can pull in either direction.

The wheel assembly may be needed to pull the unloading system to the rear of the truck or trailer. The 12 volt electric winch may be mounted to the front center floor of the bed of the truck or trailer, the lower of the wire rope may be routed through the wheel assembly and reversed back to the unloading system harness. Thus, when the power is activated to the winch, the unloading system may move to the rear of the truck or trailer.

The winch may have an upper wire rope or cable as well. The upper wire rope or cable may be attached to the back of the unloading system. Thus, when the winch is activated in reverse, the unloading system is retracted to its ready position.

The winch may have a breakable safety link attached to the upper wire rope to prevent any mechanical damage should the unloading system become jammed in any way.

A method of unloading bulk material from a truck or trailer may include the steps of: providing a truck or trailer having two side walls, a floor and a rear end; Installing a winch with a split spool onto the center front floor of a the truck or trailer; Installing a wheel assembly onto the center rear floor of a the truck or trailer; Installing the unloading system; Positioning the unloading system at the front of the truck or trailer; filling the truck or trailer bed of material or debris, leaving the tail gate of the truck or trailer closed; activating the winch to the "out" position until the unloading system firmly packs (if needed) the material or debris to the back of the truck or trailer; activating the winch to the "in" position and moving the unloading system back to the front of the truck or trailer which is now ready for more material or debris to be loaded; opening or lowering the tail gate of the truck or trailer; activating the winch to the "out" position until the unloading system reaches the wheel assembly; activate the "in" position on the winch far enough to unlatch and lower the top section of the unloading system, activate the "out" position on the winch until the unloading process is finished.

What is claimed is:
1. A truck or trailer unloading kit, comprising:
 a base comprising a first base member and a second base member;
 a first frame coupled substantially perpendicularly to and extending vertically from the first base member and the second base member;

a first swing arm rotatably coupled to the first base member and a second swing arm rotatably coupled to the second base member;

a second frame coupled to the first swing arm and the second swing arm, wherein the second frame is configured to move from a bed of one of a truck or a trailer to a position above the first frame, the first and second frames forming a continuous, substantially vertical wall;

a wheel fixedly coupled to a rear portion of the bed of one of the truck or the trailer; and a winch comprising a first cable and a second cable, the first cable coupled to a first side of the first frame through the wheel and the second cable coupled to a second side of the first frame;

wherein the base is configured to move along the bed of one of the truck or the trailer toward the rear portion of the bed in response to the winch pulling the base with the first cable; and wherein the base is configured to move along the bed of one of the truck or the trailer toward a front of the bed in response to the winch pulling the base with the second cable.

2. The kit of claim 1, wherein one of a width, a height, or both a width and height of the frame is expandable.

3. The kit of claim 1, wherein the first frame and the second frame comprise a chain link fencing material.

4. The kit of claim 1, wherein the first base member and the second base member comprise a second wheel configured to roll along the bed of one of the truck or the trailer and a third wheel configured to roll along a sidewall of one of the truck or the trailer.

5. The kit of claim 1, wherein the second frame is configured to rotate relative to first swing arm and the second swing arm.

6. The kit of claim 1, further comprising a latching mechanism, wherein the latching mechanism is configured to couple the first frame to the second frame.

7. A truck or trailer unloading kit, comprising:
a base comprising a first base member and a second base member;
a first frame coupled substantially perpendicularly to and extending vertically from the first base member and the second base member;
a first swing arm rotatably coupled to the first base member and a second swing arm rotatably coupled to the second base member, wherein at least one of the first swing arm and the second swing arm comprise a spring coupled thereto;
a second frame rotatably coupled to the first swing arm and rotatably coupled to the second swing arm, wherein the second frame is configured to move from a bed of one of a truck or a trailer to above the first frame, the first and second frames forming a continuous wall;
a wheel fixedly coupled to a rear portion of the bed of one of the truck or the trailer; and
a winch comprising a first cable and a second cable, the first cable coupled to a first side of the first frame through the wheel and the second cable coupled to a second side of the first frame;
wherein the spring is configured to assist in raising the second frame from one of the bed of the truck or the trailer to a position above the first frame.

8. The kit of claim 7, wherein the base is configured to move along the bed of one of the truck or the trailer toward the rear portion of the bed in response to the winch pulling the base with the first cable.

9. The kit of claim 7, wherein the base is configured to move along the bed of one of the truck or the trailer toward a front of the bed in response to the winch pulling the base with the second cable.

10. The kit of claim 7, wherein one of a width, a height, or both a width and height of the frame is expandable.

11. The kit of claim 7, wherein the first frame and the second frame comprise a chain link fencing material.

12. The kit of claim 7, wherein the first base member and the second base member comprise a second wheel configured to roll along the bed of one of the truck or the trailer and a third wheel configured to roll along a sidewall of one of the truck or the trailer.

13. The kit of claim 7, wherein the second frame is configured to rotate relative to first swing arm and the second swing arm.

14. The kit of claim 7, further comprising a latching mechanism, wherein the latching mechanism is configured to couple the first frame to the second frame.

15. The kit of claim 7, wherein the first swing arm comprises the spring and the second swing arm comprises a second spring.

* * * * *